United States Patent [19]

Albal et al.

[11] Patent Number: 4,821,265
[45] Date of Patent: Apr. 11, 1989

[54] NODE ARCHITECTURE FOR COMMUNICATION NETWORKS

[75] Inventors: Nandakishore A. Albal, Sunrise; Praduemn K. Goyal, Ft. Lauderdale, both of Fla.

[73] Assignee: Racal Data Communications Inc., Sunrise, Fla.

[21] Appl. No.: 35,130

[22] Filed: Apr. 6, 1987

[51] Int. Cl.$^4$ ............................................. H04J 3/12
[52] U.S. Cl. .................................... 370/110.1; 370/94
[58] Field of Search .................. 370/60, 85, 94, 110.1

[56] References Cited

U.S. PATENT DOCUMENTS

| | | |
|---|---|---|
| 4,450,554 | 5/1984 | Steensma et al. |
| 4,491,947 | 1/1985 | Frank . |
| 4,500,987 | 2/1985 | Hasegawa . |
| 4,561,090 | 12/1985 | Turner . |
| 4,592,048 | 5/1986 | Beckner et al. ................ 370/110.1 |
| 4,621,359 | 11/1986 | McMillen . |
| 4,621,362 | 11/1986 | Sy . |
| 4,633,394 | 12/1986 | Georgiou et al. . |
| 4,641,266 | 2/1987 | Walsh . |
| 4,718,060 | 1/1988 | Oguchi et al. ........................ 370/85 |
| 4,722,082 | 1/1988 | Furuya et al. ................... 370/110.1 |
| 4,736,364 | 4/1988 | Basso et al. .................... 370/110.1 |

OTHER PUBLICATIONS

*The OSI Reference Model*, D. Day and H. Zimmermann, IEEE, vol. 71, No. 12, Dec. 1983, pp. 1334–1340.
*Services and Protocols of the Physical Layer*, IEEE, vol. 71, No. 12, Dec. 1983, pp. 1372–1377.
*The OSI Network Layer: Standards to Cope with the Real World*, C. Ware, IEEE, vol. 71, No. 12, Dec. 1983, pp. 1384–1387.
*Services and Protocols of the Data Link Layer*, J. Conard, IEEE, vol. 71, No. 12, Dec. 1983, pp. 1378–1383.
"ISDN Capabilities in a Digital Local Exchange", M. Romagnoli, et al., *Proceedings 6th International Conference in Computer Communications*, 1982, Londen, Sep. 7-10, '82, pp. 37–42.
"Arbitration and Control Acquisition in the Proposed IEEE 896 Bus" by D. M. Taub, IEEE Micro., Aug. 1984.
"Variety Reigns Supreme in ISDN Chip Sets" by Joseph J. Sparda, Electronic Products, Mar. 15, 1987.
"Introduction to the Telematics System", Chapter 1, (date and further information unknown). "Helping Computers Communicate," John Voelcker, IEEE Spectrum, March 1986.

*Primary Examiner*—Douglas W. Olms
*Assistant Examiner*—Wellington Chin
*Attorney, Agent, or Firm*—Jerry A. Miller

[57] ABSTRACT

An architecture for a switching node of a communication network includes a dedicated hardware Layer 1 processing portion and a Layer 2 and 3 processing portion based on multiple programmed general purpose processors. An array of such processors are used with an arbitration scheme for selecting which of the processors is to be used for any given Layer 2 or Layer 3 process. The architecture allows the node's capacity to be expanded by simply adding more processors to handle increased traffic.

28 Claims, 7 Drawing Sheets

NODE ARCHITECTURE FOR COMMUNICATION NETWORKS

BACKGROUND OF THE INVENTION

1. Field of the Invention

This invention relates to the architecture of a switching node that handles the D Channel out-of-band signaling protocol of an Integrated Services Digital Network (ISDN).

Typically, the application of such a node can be found in systems requiring D Channel message processing. More specifically, the present invention finds it primary utility in the area of digital networks implementing ISDN.

2. Glossary

The following terms may be used freely in this document:

ASP Assignment Source point. That entity in the network at layer 2 which manages the TEI values.

B Channel The bearer channel, logically different from the D Channel. The B Channel does not carry any signaling in-band for all processing on ISDN.

Basic Rate Interface A defined user-network interface. Contains 2 B Channels and a D Channel, logically multiplexed together at Layer 1.

CCITT International Telegraph and Telephone Consultive Committee. An international body which establishes communication standards.

CES Connection Endpoint Suffix. The Layer 3 identifier, similar to the TEI at Layer 2. The CES and TEI have a one-to-one correspondence.

CO Central Office.

DCE Data Circuit Terminating Equipment.

D Channel The signaling channel is ISDN. 16 Kbps in the basic rate interface and 64 Kbps in the primary rate interface.

Demux Demultiplexer.

DIP Dual Inline Package.

DLCI The LAPD address. DLCI=SAPI+TEI.

DSL Digital Subscriber Loop. The connection between the network node and the customer.

DTE Data Terminal Equipment.

IC Integrated Circuit.

ISDN Integrated Service Digital Network.

ISO International Standards Organization. An international body of technical experts which proposes and establishes technical standards.

LAPB Link Access Protocol Balanced.

LAPD Link Access Protocol on the D Channel of ISDN.

LSB Least Significant Bit.

MSB Most Significant Bit.

Mux Multiplexer.

Out-of-Band Signaling When a separate logical channel is used to transport the signaling information.

OSI Open System Interconnection.

Primary Rate Interface A defined user network interface containing 23 B Channels (or 30 B Channels) and a D Channel (64 Kbps) logically multiplexed together at Layer 1.

2B+D Two Bearer (2B) channels for carrying User data plus one signaling (D) Channel used in basic rate ISDN.

23B+D 23 Bearer (23B) Channels for carrying User data plus one signaling (D) Channel used in Primary Rate ISDN.

S, T, U References Reference points defined in the ISDN user-network interface.

Peer Communicating Entities at the same given layer.

SAPI Service Access Point Identifier. A part of the LAPD address. Identifies the type of Layer 3 entity associated with the call.

TEI Terminal Endpoint Identifier. A part of the LAPD address, identifying at Layer 2 the unique terminal that is associated with the call information.

BACKGROUND AND OVERVIEW OF ISDN

At this writing, ISDN is in the process of evolving into a telephony Integrated Digital Network that provides end-to-end digital connectivity to support a wide range of services, including voice and non-voice services, to which users have access by means of a limited set of standard multi-purpose user-network interfaces. An ISDN contains the intelligence for providing service features, maintenance and network management functions. The architecture of ISDN standards closely follows the OSI seven layer Reference Model, although these standards do not map exactly onto existing OSI protocols. Only the lower three layers of the OSI model are of primary interest in considering the present invention. The following background information is provided as a general overview of ISDN as it is currently proposed by various standards organizations and is not intended to be limiting to the present invention since the standards themselves are currently in the process of evolving and the present invention may be equally applicable to a number of variations of ISDN.

Two main entities exist in an ISDN: the network and the user. The network provides services (which are the communication capabilities made available to the customer by telecommunication service provider) and the user accesses these services through the user-network interface. A "channel" represents a specified portion of the information carrying capacity of an interface. Channels are classified by channel types. The channel types and their uses in Basic Rate ISDN are:

The B Channel is a 64 Kbps channel accompanied by timing. It is intended to carry a wide variety of user information streams, and does not carry any signaling information for switching the B Channel.

The D Channel is a 16 Kbps channel for the Basic rate interface. It is primarily intended to carry signaling information for circuit switching by the ISDN. All the ISDN work that is bein done with reference to signaling, refers only to the D channel. The D Channel uses a layered protocol, and the data flow is only in packets.

The architecture of the present invention may be used at either basic rate or primary rate with suitable modifications evident to those skilled in the art. For simplicity of explanation, the bulk of the present description, both as the background of ISDN and as to the invention itself, will be confined largely to basic rate. Those skilled in the art will appreciate that the present invention may be used at either basic rate, primary rate or at other rates dictated by the design of ISDN networks or future standards. The Basic Rate Interface consists of two B Channels and one D Channel, commonly referred to as "2B+D". All the signaling and some low speed communication is done on the D Channel, while the bearer B Channels are used exclusively for data transport. This concept is called out-of-band signaling. Some of the advantages of out-of-band signaling are:

1. The entire bandwidth of the bearer channel is available for the user.

2. Uniform signaling procedures are available, without regard to the data type being transported on the bearer channel.

3. Since the signaling channel is separate, the response time is better than in-band signaling, and processes can be dedicated for signaling.

Those skilled in the art will recognize other advantages of out of band signaling.

Communication in an ISDN generally occurs between peer entities (for example, Physical Layer to Physical Layer communication, etc.), and between the layers (for example, between Layer 2 and Layer 3). Peer entities in the Data Link Layer communicate using the LAPD or Link Access Protocol on the D Channel. At the Network Layer (Layer 3), the CCITT Recommendations 1.450/Q.930 and I.451/Q.931, which are incorporated by reference, define the applicable communication.

Peer entitles at Layer 3 communicate using messages. Layer 3 is primarily responsible for the establishment, maintenance and disestablishment of each call, and each call is uniquely identified by a call reference number. Also, every call reference is associated with a Layer 3 entity called the Connection Endpoint Suffix (CES).

Each CES can support more than one call reference. Every Layer 3 message is packetized into a Layer 2 frame, the format of which is as shown in CCITT Recommendations I.440/Q.920 and I.441/Q.921 which are incorporated by reference. The address field (DLCI) is two bytes long and has two sub parts, viz., the Service Access Point Identifier (SAPI) and the Terminal Endpoint Identifier (TEI). The SAPI identifies the logical type of Layer 3 frame, (e.g. ., signaling, packet etc.), and the TEI identifies the particular terminal which is associated with this message. The TEI is assigned by the network node, either at initialization time, or when a call is being setup, and the entity making making the assignment is the Assignment Source Point (ASP). The ASP is also responsible for removal of the TEI.

The D Channel and the B channel data streams are combined at Layer 1 into a format defined in CCITT Recommendation I.430 which is incorporated by reference. In case there is no useful data to transmit, a string of 1's is transmitted at Layer 1.

The functions of the lower three layers may be summarized as follows:

Layer 1: Activation, deactivation, port number record.

Layer 2: TEI management (by the ASP), timer and counter management, error detection and recovery management, link state management, buffer management, communication with Layers 1 and 3.

Layer 3: Call state management, communication with Layers 2 and 4, control of switch fabric for B channel switching, port number—directory number mapping.

When an ISDN terminal or device is powered up, Layer 1 goes through an activation sequence with the Layer 1 device at the network node, and synchronizes itself. When prompted by the user to establish a connection, the communication manager at Layer 2 communicates with the ASP, and gets a TEI assigned to itself. Using the TEI value, a Layer 2 link is established between the Layer 2 processes at the terminal and at the node. Once this is done, the Layer 3 processes communicate using the services of the lower two layers. It should be noted that at Layer 2, once a link is set up, flags are transmitted in between frames. When the signaling is complete, the bearer channels are 'cut-through' by the network, and communication as we know it can occur.

To tear down a connection, the Layer 3 peer entities disassociate themselves from each other, then the Layer 2 entities do the same. At this point, when no Layer 2 frames are given to Layer 1, a sequence of 1's is transmitted in the place of the D Channel bits.

The present invention provides a method and apparatus for implementing Layer 2 and Layer 3 processing in a network node providing an efficient modular system which can readily accommodate growth of the network. Some of the specific advantages offered by the architecture of the present invention are:

1. A modular architecture, providing easy change to the node, when the number of users or trunks change.

2. An architecture that supports minimum processing delay.

3. A plurality of processors are used to handle Layer 2 and Layer 3 processes with general purpose processors. An arbitration process is used to determine which processor is used for each process and the arbitration scheme used in dynamic (service based on the number of unsuccessful attempts to access the bus), based on the signaling load.

4. The architecture frees the implementor from using one type of processor. As long as the interface specification (gateway) is adhered to, virtually any appropriate processor, general purpose or dedicated, can be used.

5. The architecture allows for low cost implementation by using only the amount of processing power required by the data traffic supported by the node.

6. The node is easily upgraded by addition of processors as required to handle additional traffic.

7. The queues are arbitrated in a manner similar to that of the processors with priority determined by a priority number computed from queue length+number of unsuccessful bus accesses.

SUMMARY OF THE INVENTION

It is an object of the present invention to provide an improved node architecture for concurrent processing of multiple D Channel messages in an ISDN.

It is another object of the present invention to provide a node architecture which can be easily expanded to handle increased data traffic through the node.

It is another object of the present invention to provide an improved method of bus arbitration for multiple processors.

It is another object of the present invention to provide an improved method of bus arbitration for queues.

It is a further object of the present invention to provide a node architecture which uses a modular design for enhanced economy of scale of the parts used.

These and other objects and advantages of the invention will become apparent to those skilled in the art upon consideration of the following description.

In one embodiment of the present invention, an improved node for processing ISDN D Channel messages includes a node for a communication system for processing lower Layers in a D-Channel ISDN message, comprises in combination an interface for receiving an ISDN signal from a transmission line. A demultiplexer demultiplexes the ISDN signal into a D-channel message and performs Layer 1 processes on the D-Channel message. A processor bank includes a plurality of processors for receiving the D-Channel message after the D-Channel message is processed by the demultiplexer and performs a Layer 2 process on the D-Channel message. A self selection arbitration circuit associated with each processor determines which of the plurality of processors is to perform the Layer 2 process on the D-Channel message. Similarly, the Layer 3 processes may be performed by one of the plurality of processors.

In a method for processing a D Channel ISDN message according to the present invention, an ISDN signal is received from a transmission line. The ISDN signal is demultiplexed to produce a D Channel message and a Layer 1 process is performed on the D Channel message. One of a plurality of available processors is selected to perform a Layer 2 process on the D Channel message after the Layer 1 process has been completed. The method further comprising the step of performing the Layer 2 process after the Layer 1 process. Next, one of the plurality of available processors is selected to perform a Layer 3 process on the D Channel message after the Layer 2 process has been completed and then the Layer 3 process is performed after the Layer 2 process. In the preferred method, the selecting step includes the step of arbitrating among the plurality of processors by computing a priority number (PN) for each of the plurality of processors, the priority number being based upon the number of failed bus accesses by the particular processor. The queues may also be arbitrated using a priority number computed from the queue length plus a number of unsuccessful attempts to access a bus.

The features of the invention believed to be novel are set forth with particularity in the appended claims. The invention itself, however, both as to organization and method of operation, together with further objects and advantages thereof, may be best understood by reference to the following description taken in conjunction with the accompanying drawings.

DETAILED DESCRIPTION OF THE INVENTION

Figure 1:
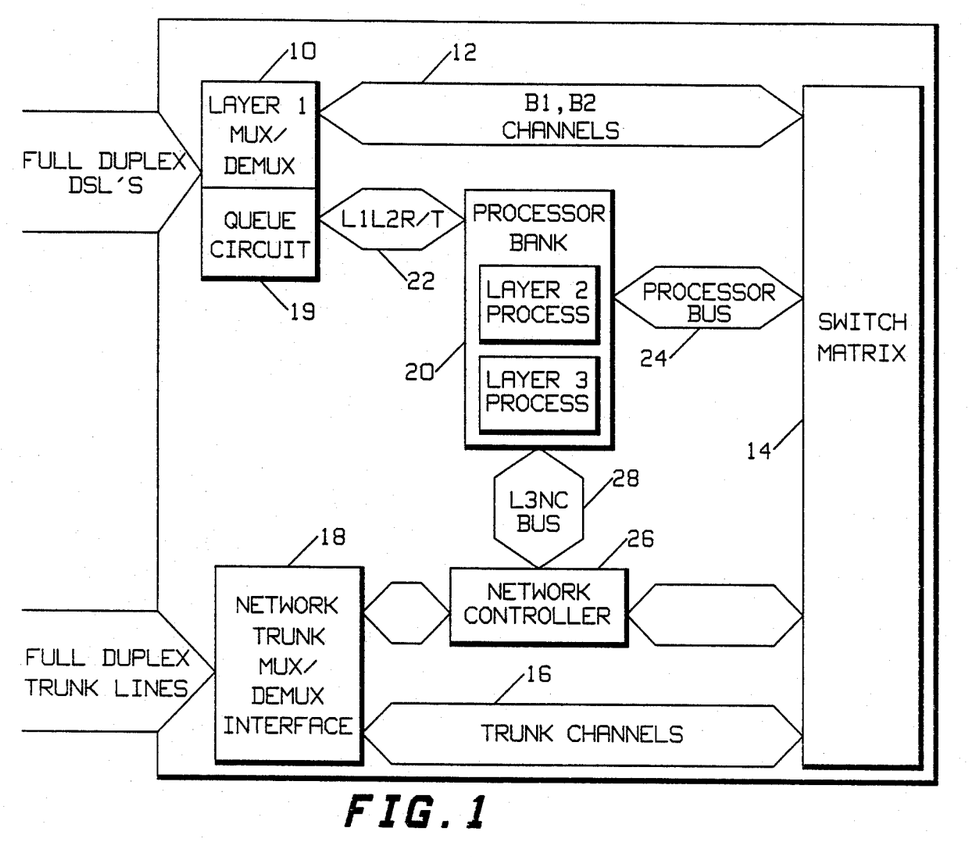
FIG. 1 shows an architecture overview of a node according to the present invention.

Turning now to the FIGURES in which like reference numerals designate corresponding parts in each of the several views and in particular to FIG. 1, an overview of the architecture of the present node is shown. It may be helpful to refer also to FIGS. 2 through 4 in conjunction with FIG. 1 from time to time. In FIG. 1, a plurality of full duplex DSLs are coupled to individual (preferably hardware based) Layer 1 Multiplexer/Demultiplexers 10. One such Multiplexer/Demultiplexer 10 is provided for each DSL coupled to the node. The B1 and B2 channels are separated at 10 and coupled via B1/B2 Channel Bus 12 to a switch matrix 14. Switch matrix 14 is coupled via trunk channels 16 to a Network Trunk Multiplexer/Demultiplexer Interface 18 which is in turn coupled to a plurality of Full Duplex Trunk Lines. Layer 1 Multiplexer/Demultiplexer 10 is also coupled to a queue circuit 19 (one for each DSL) which is in turn coupled to a common Processor Bank 20, which is shared by all of the DSLs, via a Layer 1 Layer 2 Receive bus and a Layer 1 Layer 2 Transmit bus (collectively referred to herein as L1L2R/T) 22. The Processor Bank 20 is also coupled to the switch matrix 14 via processor bus (PB) 24. A network controller 26 is also coupled to the Processor Bank 20 via a Layer 3 network controller bus (L3NC) 28. Network Controller 26 is also coupled to switch matrix 14 and Network Trunk Multiplexer-Demultiplexer 18 via bus connections.

In the present example architecture of FIG. 1, the entire node is depicted as located within a single block implying that the individual component functional blocks are situated closely together. However, this should not be limiting since, for example, switch matrix 14 and network controller 26 could be remotely located. Such implementations may require an additional interface circuit at one or both ends to maintain proper timing and bus cycles. In this time, the processor bus might be better implemented as serial communication. Similarly, any of the various bus communication might be implemented serially rather than in the form of parallel buses without departing from the spirit of the present invention. Also, it is possible for multiple processor banks 20 to be utilized as well as multiple network controllers 26 in which case L3NC bus 28 might be replaced with an interconnection network. Those skilled in the art will recognize numerous other variations which are possible within the scope of the present invention.

As explained earlier, multiple terminals typically communicate with each node in an ISDN network. Each communication has a peer-peer communication relationship, and due to the inherent property of the layered architecture, inter-layer communication occurs. Also, at each layer, multiple functional entities exist which need to communicate with other entities at their layer.

Typically, a node might serve many (perhaps up to 10,000 or more) Digital Subscriber Lines (DSLs). Each DSL is preferably full duplex, and the data transfer rate of the D Channel irrespective of the interface (S or T or U), is 16 Kbps (for basic rate). Each DSL has a port number assigned to it, and is associated with a network unique address at Layer 3 (like a telephone number). The node also supports trunks to other nodes which are preferably full duplex trunk lines, and a network controller which also may control a part of the switching fabric. The switch matrix 14 and network controller 26 have been mentioned and shown for completeness, but at not described in detail in this document since such devices are well known in the art and they do not actually form a portion of the present invention.

To provide the Layer 1 functions for each DSL, every DSL has a Layer 1 processor represented by 10 and 19 (preferably a dedicated IC Chip and associated circuitry for each DSL) to perform the Layer 1 functions and a portion of Layer 2. Such Layer 1 hardware is presently known and available commercially in the form of various dedicated ISDN ICs (See for example "Variety Reigns Supreme in ISDN Chip Sets", Joseph J. Spadaro, *Electronic Products*, Mar. 15, 1987, pp 55–58.). At Layer 2 the functionality can be divided into hardware intensive (frame formatting, error detection, inter-frame flag stuffing and detection), and software or firmware intensive (the remainder of the LAPD protocol). The hardware portion can be handled by inexpensive dedicated ICs similar to those currently available from a number of major semiconductor manufacturers, while a processor such as a programmed microcomputer is used for the software execution. If every Layer 2 frame is preprocessed by the hardware, then only properly formatted, error free frames need to be processed by the processor, thus saving processor time. According to the present invention, this is implemented by requiring that every DSL have an associated LAPD frame formatter as part of queue circuit 19, the output of which is handled by a programmed general purpose processor such as a microcomputer.

Even if the node services 10,000 DSLs, the probability of all of the DSLs being active simultaneously is generally very low. Thus, each node need not have as many processors to handle the Layer 2 and Layer 3 signaling as DSLs. Every Layer 2 frame can contain information that has to be processed at Layer 3, and Layer 3 processing being software intensive, needs a processor. The Layer 3 process also controls the switch fabric for the B channel switching, and interfaces with the network controller for interexchange signaling. The present invention advantageously utilizes tthis characteristic to determine the appropriate partitioning of the hardware architecture.

Figure 2:
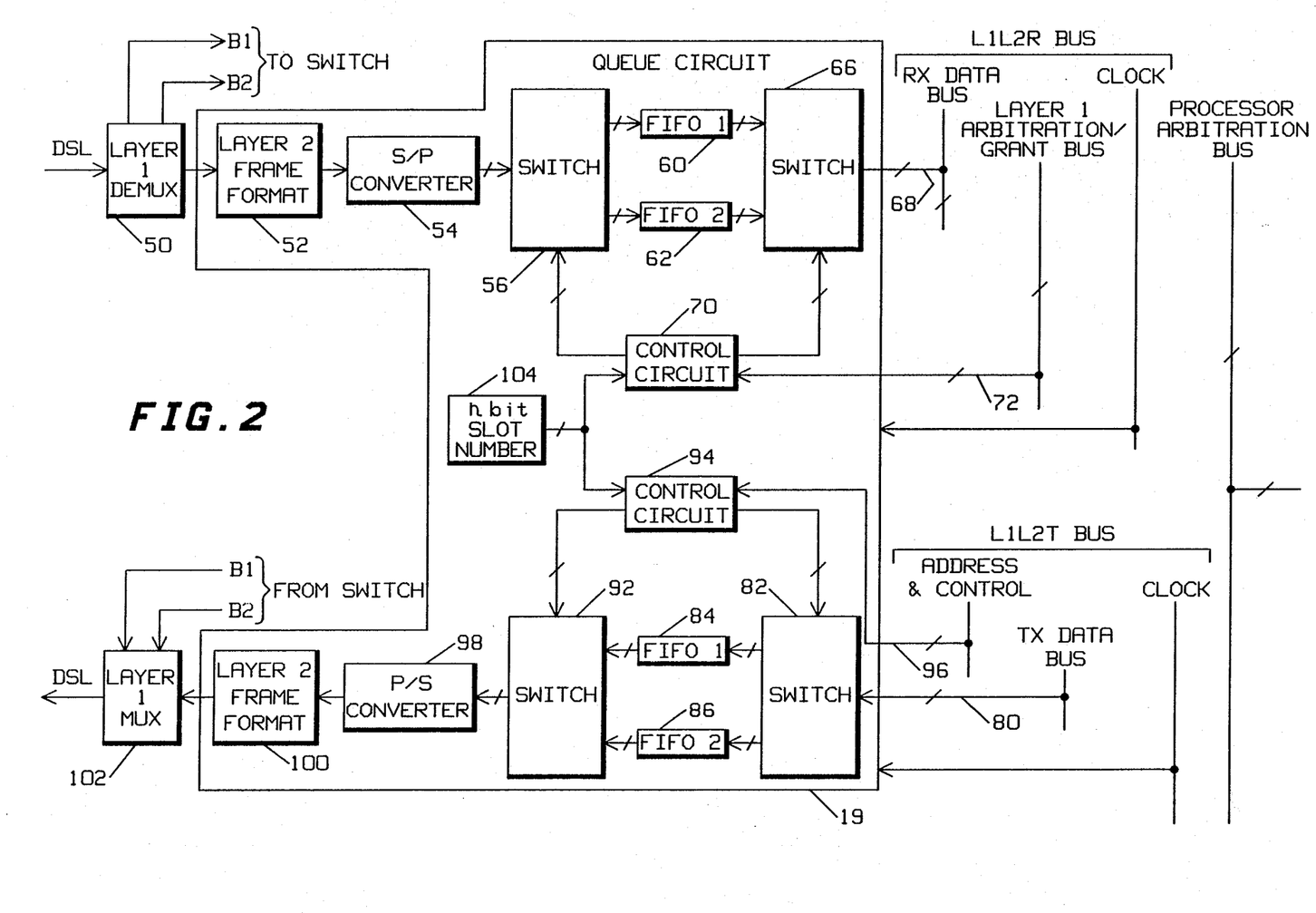
FIG. 2 shows a more detailed diagram of the Layer 1 processing portion of the present invention.

Turning now to FIG. 2, a more detaled diagram of Layer 1 and partial Layer 2 processing portion of the present invention is shown. The queue circuit 19 is shown in more detail than in FIG. 1. A Layer 1 Demultiplexer 50 receives incoming signals from a DSL and separates the B1 and B2 channels from the D Channel. The B1 and B2 channels are sent to the switch matrix and the D Channel is sent to a Layer 2 frame formatter 52. Demultiplexer 50 also extracts a clock signal from the incoming signal and provides that clock signal to the Layer 2 frame formatter 52. The Layer 2 frame formatter 42 ensures that the elements of LAPD are adhered to by checking the FCS etc. and applies the valid frame to a serial to parallel converter 54. The serial to parallel converter 54 passes a parallel form of the signal to a controlled switch 56 which in turn delivers the signal to one of a plurality of FIFO registers (60 and 62) arranged as a circular queue FIFO. For clarity, only two FIFOs are shown in FIG. 2 but it is understood that any appropriate number could be substituted. A second switch 66 receives the output of one of the two FIFOs and delivers this output to receive data bus 68 forming a part of the L1L2R bus. Switches 56 and 66 operate under the control of control logic 70 which operates on information provided by Layer 1 arbitration bus 72 as will be described later. Switch 56 operates to select an appropriate FIFO for queueing of the next data packet while switch 66 selectively removes packets from the queue in the appropriate order.

Information received from a transmit data bus 80 is received by a circular queue and FIFO and switch structure similar to that disclosed above. The transmit data bus 80 is coupled to a controlled switch 82 which directs the signal alternately to either FIFO 84 or FIFO 86 depending on the switch position. The outputs of the FIFOs 84 and 86 are coupled to a second switch 92. Switches 82 and 92 are controlled by a control logic circuit 94 responsive to address and control bus 96 forming a part of L1L2T bus. The output of switch 92 is coupled to a parallel to serial converter 98 which converts the parallel bus signal to a serial signal for processing by a Layer 2 frame formatter 100 which adds the FCS etc. ... After conversion of the signal into a Layer 2 frame, it is passed on to a Layer 1 multiplexer 102 for multiplexing with B1 and B2 channels from the switch fabric and transmitted over the DSL. Demultiplexer 50 the multiplexer 102 collectively make up Layer 1 Mux/Demux 10 of FIG. 1. It should be noted that local traffic can both enter and leave the DSLs, transit traffic traffic can both enter and leave the trunk lines and other traffic can occur between DSL and trunk lines by appropriate switching at the switch matrix.

Controllers 70 and 94 may be implemented either in dedicated hardware as will be described later or may be alternatively implemented as a programmed general purpose processor. In either case, they are responsible for providing the queue arbitration for the present invention as described later. The processor arbitration is preferably conducted by the processors themselves as will become clear after consideration of later discussions. Control circuits 70 and 94 each receive an n bit slot number 104, which may be the same number for both controllers, for use in the arbitration process as will be described later.

According to the present invention, the partitioning of the circuitry as described above is done as follows. A Layer 1-partial Layer 2 module as shown in FIG. 2 is provided for every DSL. This interfaces to the processor bank 20 which handles Layer 2 and Layer 3. The DSL interface connects to the switch fabric, and the Layer 3 process interfaces with the network controller 26.

Figure 3:
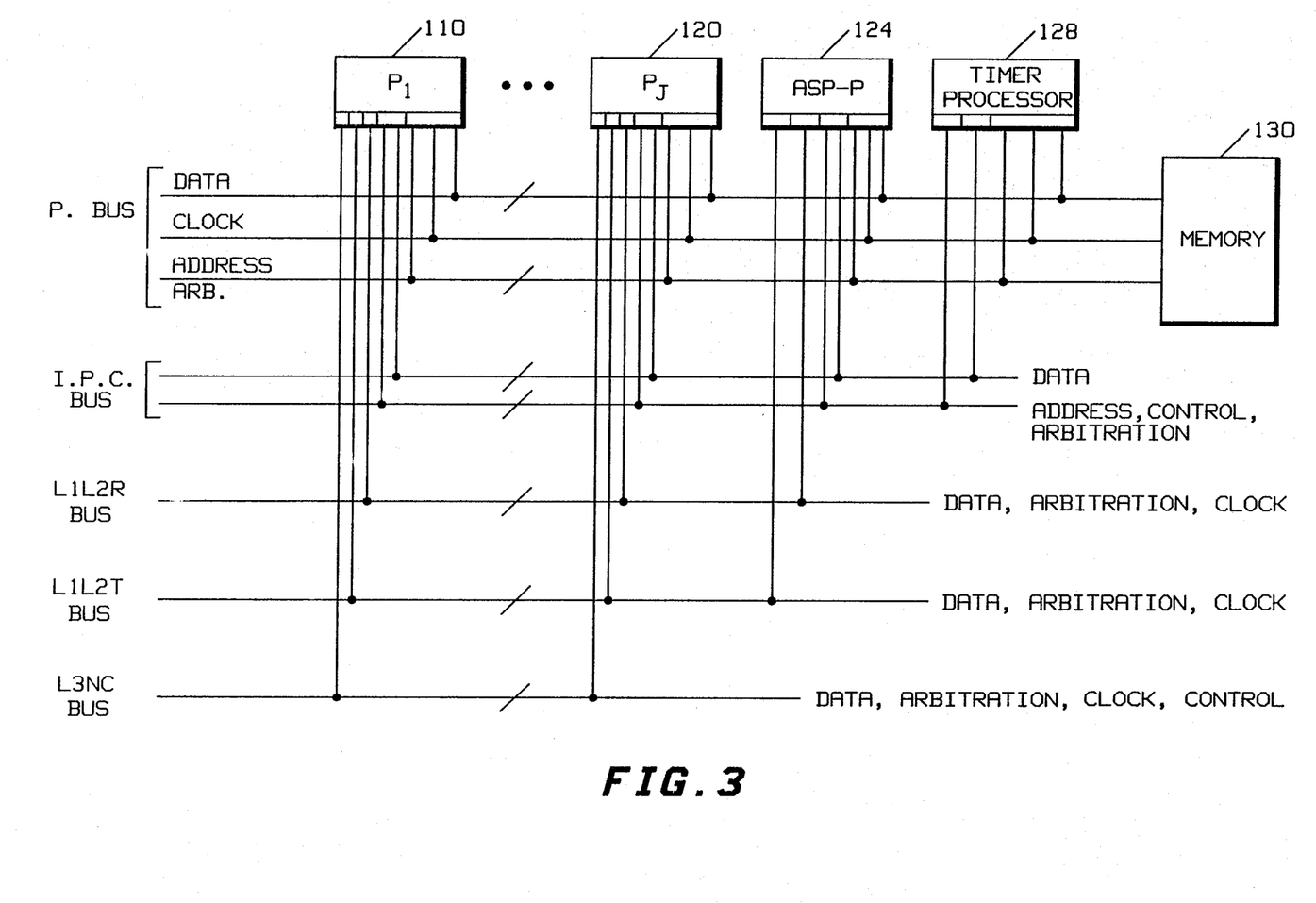
FIG. 3 shows a diagram of the processor bank interconnection to the various buses and memory.

Referring to FIG. 3, the Layer 2/Layer 3 processor bank is shown in more detail. The processor bank includes a plurality of J processors designated 110 through 120 together with an Assignment Source Point (ASP) processor 124 and a timer processor 128. Each of these processors have access to a common memory 130 which stores a timer expiration stack, Layer 3 addresses served by this node, a map of DSL number to Layer 3 addresses, program, and working areas for: TEI management, DSL numbers, CES, Layer 2 active frame state, variables, counters, buffers for Tx and Rx, Layer 3 active call states and other information which is commonly shared among the various processors. Each of the processors is coupled together by the processor bus which is also coupled to memory 130. Each processor is also coupled to each of the other processors by the interprocessor communication bus. In addition, the processors, except timer processor 128, are coupled together by L1L2% and L1L2R bus. The Layer 2/Layer 3 processors are also coupled together via the L3NC bus as shown. Each of the processors also receive an n bit slot number determined by the slot the processor is plugged into (not shown) for use in the arbitration process as will be described. The number of processors used may be essentially arbitrarily large according to the needs of the node.

In the user-to-network direction, the Layer 1 process accepts Layer 1 frames, and separates the D and B Channels. The B channels are routed on individual lines to the switch matrix, and each DSL has 2 lines, one for each B channel in the preferred embodiment. The D Channel is processed by the LAPD frame formatter 52, and if the frame is not in error, it is stored.

The Layer 2 frame is transported across the Layer 1/Layer 2 Receive Bus (L1L2R Bus), to the processors running the Layer 2 process. Once the Layer 2 processing is done, the result is stored in a memory for a processor running Layer 3 to process it. The same processor handling Layer 2 could in fact, handle the layer 3 process also. Note that the processors are not dedicated to handle Layer 2 or Layer 3 processes, as a general rule. Exceptions to this rule are possible as described later. The Layer 3 process communicates with the network controller on the Layer 3—Network-Controller Bus (L3NC Bus). The processors communicate with each other using the interprocessor bus IPB. The processors communicate with the global memory and the switch fabric using the Processor Bus (PB).

In the network to user direction, the processor running the Layer 3 process stores the information for the processor running Layer 2 to act on it. Once this is done, the Layer 2 frame is handed to the Layer 1 process (a particular DSL) using the Layer 1/Layer 2 transmit bus (L1L2T Bus).

The interexchange B1 and B2 channels interface to the switch matrix as shown. The switch itself is not described in detail as it is not necessary for a complete understanding of the present invention but has been shown for completeness.

Figure 4:
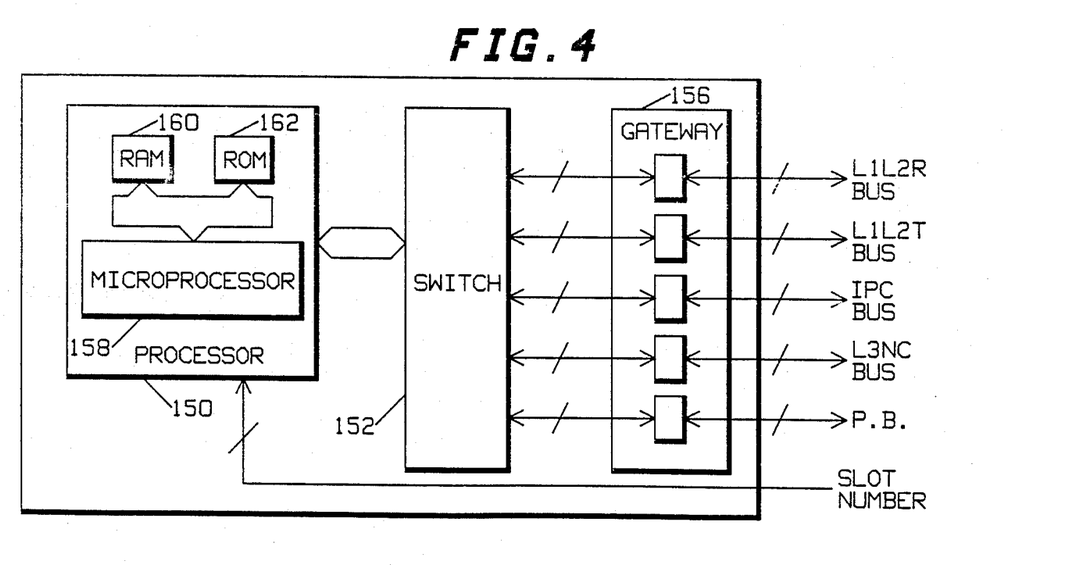
FIG. 4 shows a more detailed diagram of the structure of a single processor unit.

Each of the Processors for Layer 2 and layer 3 processing are preferably configured as shown in FIG. 4 to allow any of a variety of general purpose processors (or dedicated processors if desired) to be used. Of course, those skilled in the art will appreciate that by using the present architecture, special purpose processors which can perform Layer 2 and Layer 3 processes more efficiently may also be interfaced to the present node. A general purpose processor 150 such as a microprocessor 150, including it's own internal bus and specific hardware, is coupled to a switch circuit 152 which connects a gateway 156 to each of the buses to which the processor communicates. The gateway structure depends on the specific processor being used. This structure allows virtually any high speed processor to be used so tht economics and node requirements may dictate the processor used for any given situation. In the preferred embodiment, a general purpose processor such as microprocessor 158 with it's associated RAM 160 and ROM 162 is used. Preferably, the processor 150 includes some form of nonvolatile memory such as ROM 162 which can be used to store a constant $\beta$ for use in the arbitration process as will be described later. The constant $\beta$ may be related to the power of the microprocessor 158 and it's ability to perform Layer 2 and Layer 3 processes. It may also be related to the characteristics of the network.

Referring back to FIG. 1 and FIG. 2, a Layer 2 frame is typically 136 bytes long, and each Layer 1 frame has 4 D bits every 250 micro seconds. Therefore, it takes 68 milliseconds to receive a complete Layer 2 frame. The DSLs are serial, and as the stream is processed by the Layer 1 device, the D Channel bits are converted to parallel at serial to parallel converter 54 after processing by the LAPD frame formatter 52. Those skilled in the art will recognize that the signal stream may possibly be converted to parallel prior to Layer 2 formatting at 52 in alternative embodiments. The Layer 2 frame formatter checks the FCS, and if it is correct, stores the frame in a FIFO (60 or 62). A circular list of FIFOs is maintained by the control circuit 70, with each FIFO holding one packet of 136 bytes. For simplicity, only two FIFOs are shown in the drawing, but this is not to be limiting. The circular list holds a queue of pending packets. The queue length is used, in the preferred embodiment, as one factor for arbitrating for the L1L2R bus. In FIG. 2 the Layer 1 process is shown with the circular list having two FIFO elements. The control directs which FIFO the input stream should be fed to, and also monitors how full the FIFO list is. The control also points to the FIFO from where the processor handling Layer 2 can read the packet.

Figure 5:
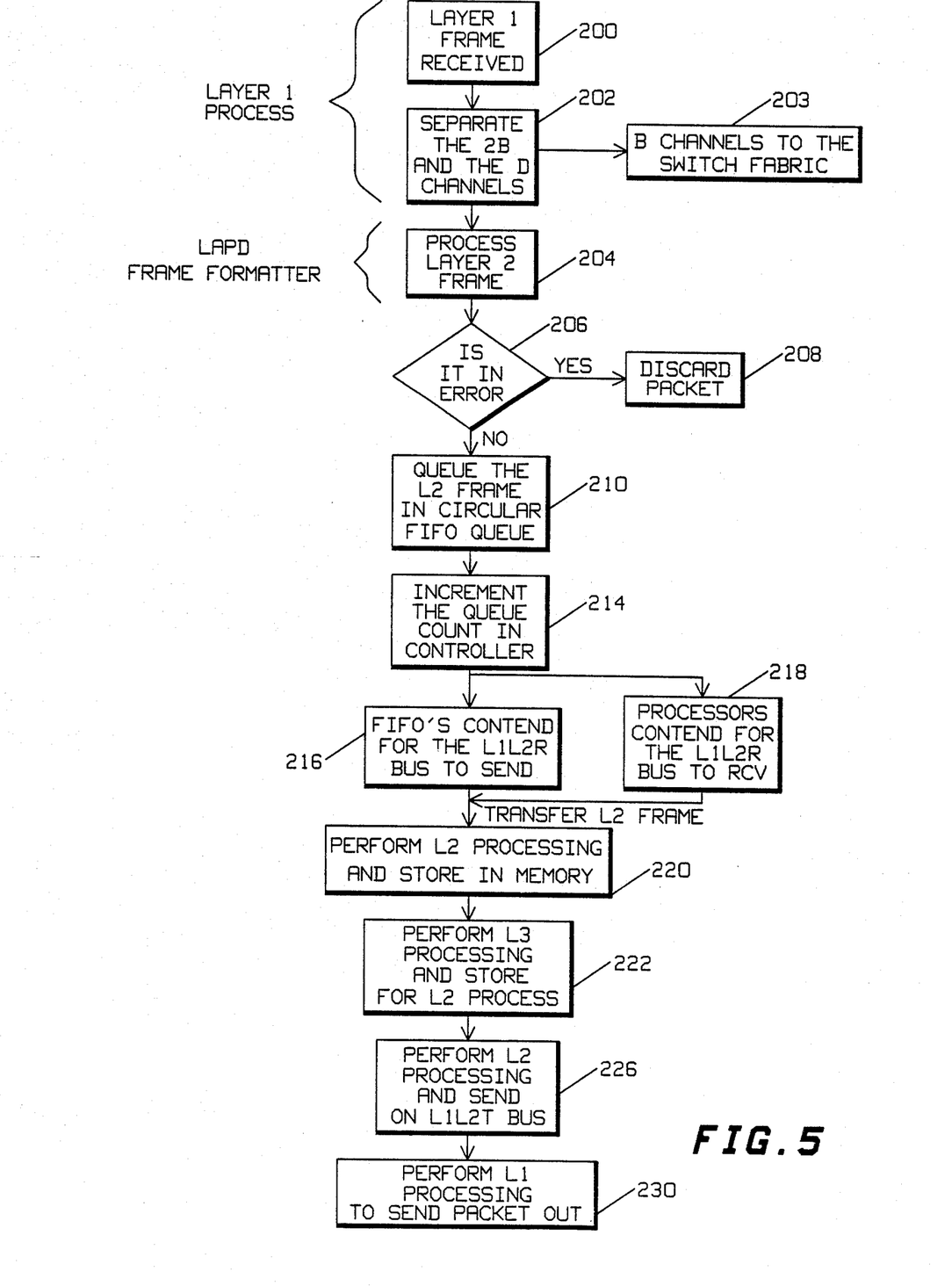
FIG. 5 shows a flow chart of the operation of the present node.

Turning now to FIG. 5, a flow chart of the overall operation of the present node is shown. When a Layer 1 frame is received at 200 it is separated into B1, B2 and D Channels at 202. The B Channels are sent to the Switch matrix at 203 for routing to the appropriate destination. The D Channel is passed to step 204 for processing into a Layer 2 frame. At step 206 the frame check sequence (FCS) is checked and the packet is discarded at 208 if an error is detected. The higher level protocols then recover from the error according to the established protocol. If no error is found at 206, the Layer 2 frame is placed in a circular FIFO queue at 210. A queue count in the controller is then incremented at 214. At this point the FIFOs contend for the L1L2R bus to send at 216 and the Processors contend for the L1L2R bus to receive at 218. When the present packet obtains access to th bus, the Layer 2 frame is processed at 220 and stored in memory. A Layer 3 process is then performed at 222 and stored in memory for a Layer 2 process. A Layer 2 process is then performed at 226 and the processed frame is sent to the L1L2T bus. Control then passes to step 230 where a Layer 1 process is performed and the packet is sent out over the DSL.

Since the whole operation is asynchronous, and the time to process is short, the FIFOs have to be emptied rapidly. One fair way this can be done is allow the longest FIFO queue to gain access to the L1L2R bus. This can be achieved by allowing the control logic to arbitrate among themselves, knowing the length of their FIFO queues. The operation and circuitry is similar to the one described in "Arbitration and Control Acquisition In the Proposed IEEE 896 Futurebus", D. M. Taub, IEEE Micro, August 1984 which is incorporated by reference. In this scheme a fixed priority number for bus arbitration is used. In the present invention, the queue length is used as a portion of the priority number for bus arbitration. This ensures that the longest queue is serviced in a timely manner, and the particular queue serviced is dependent on the dynamics of the signaling taffic. Thus the L1L2R bus need to have an arbitration (and grant) bus, a data bus, and clock bus components. The arbitration among the Layer 1 devices can occur while a data transfer is occurring between the layer 1 process and a processor in the processor bank.

In the present invention, a substantial degree of parallel processing is used to enhance the efficiency of the process. The arbitration may be carried out during the data transfer cycles wherein data is passed to and from the L1L2R/T buses. In addition, each of the processors in th processor bank may be actively processing Layer 2 and Layer 3 processes essentially simultaneously. Timing is derived by extracting clock information from a master clock situated in the network.

Figure 6:
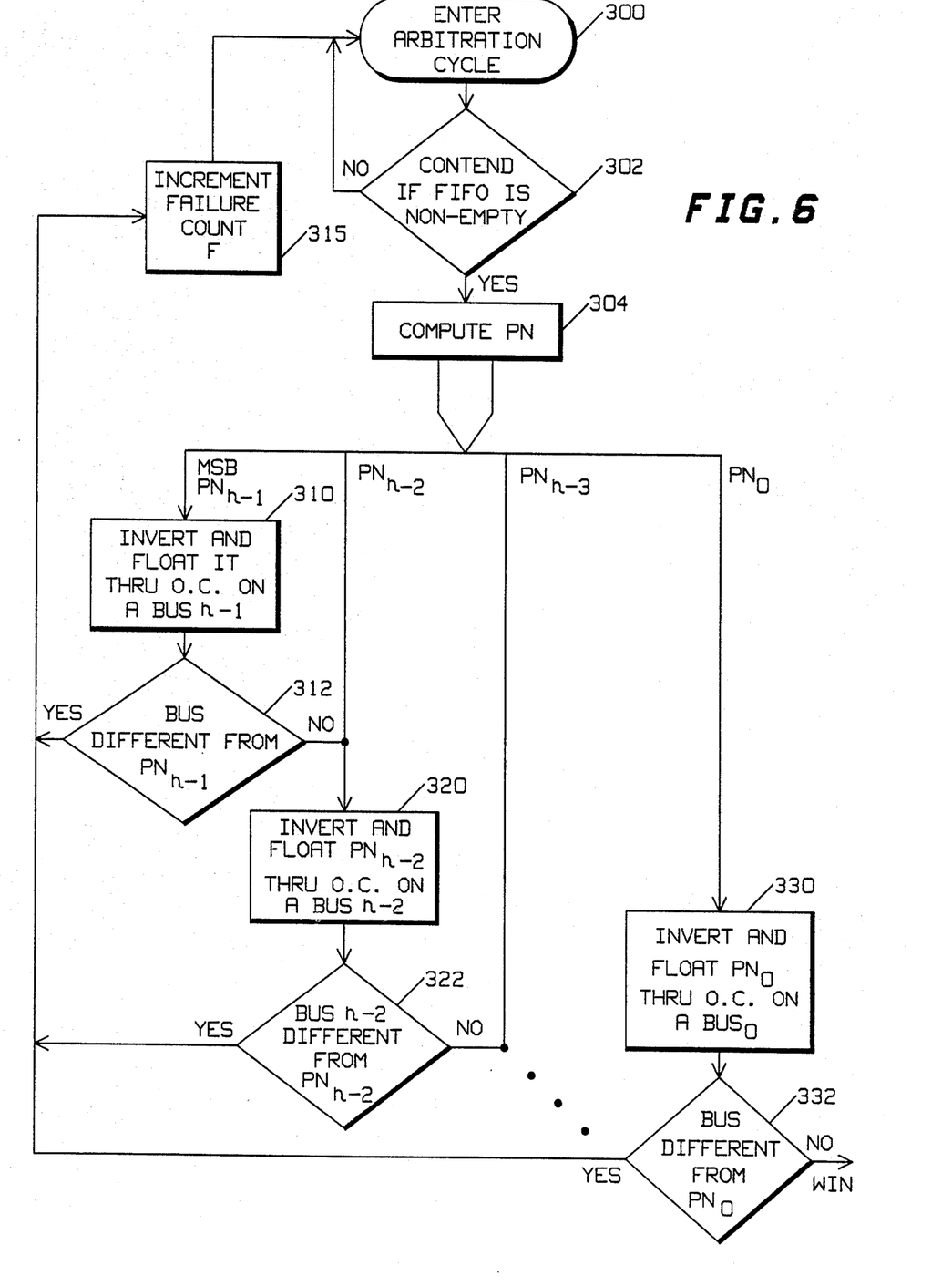
FIG. 6 shows a flow chart of the arbitration method used in the present invention.

If the preferred embodiment, an arbitration process is used as described in FIG. 6. Similar forms of arbitration are used for both processor arbitration and queue arbitration except that processor arbitration does not utilize a queue length factor. This arbitration scheme uses a combination of queue length (L), number of failures in accessing the bus because of presence of higher priority accesses (F) and the slot number (N). The priority number (PN) is then determined by:

$$PN = CON\{(\alpha L + \beta F), (N)\} \quad (1)$$

where:
L is a queue length (may be thought of as zero for processor arbitration)
F is bus access failures (used for both queue arbitration and for processor arbitration)
N is a slot or processor number (used for processor and queue arbitration.
$\alpha$ is a constant which determines the importance of queue length to a particular node; and
$\beta$ is a constant which determines the importance of tolerable delay to a particular node.
CON{X,Y} is a binary Concatenation function wherein a single binary string is formed by joining together two binary strings X and Y such that the bits of X are used as the most significant bits (MSB) and the bits Y are used as the least significant bits of the resultant string. This of course be implemented either in serial or parallel circuits as required.

In the case of processor arbitration queue length is irrelevant so that the arbitration equation simplifies to:

$$PN = CON\{\beta F, N\} \quad (2)$$

In these equations, the slot number of the processor or controller 19 (or processor number or controller number) is used essentially as a tie breaker in the event two processors or controllers have the same priority. Various techniques for accomplishing this will be clear to those skilled in the art. In the present embodiment, the PN is formed by adding the contribution of the queue length L and the number of bus failures F. This sum is used as the most significant bits of the PN and the slot number is concatenated to form the least significant bits. The arbitration is accomplished in the preferred embodiment by each of the processors floating their priority number on the arbitration bus. The arbitration bus is of open collector design so that there is essentially a bit by bit arbitration on the bus and the processor with the lowest number (highest priority) has priority for the next process. This bit by bit arbitration method is as described in the Taub article. The constants $\alpha$ and $\beta$ are weighting factor used for weighing the importance of queue length and bus access failures in the particular network at hand. These factors may be used to give a particular DSL higher or lower priority on the network by making the factors higher or lower respectively for purposes of the queue arbitration. They may also be used for minimizing queue delays in heavily utilized lines. These weighing factors may also be used to compensate for processing power for various processors. For example, a faster and more powerful microprocessor based processor may be given a relatively high priority by making $\beta$ relatively large whereas a less powerful (but perhaps less costly) processor may be assigned a lower $\beta$ value. In this manner, a more powerful processor which can perform Layer 2 and Layer 3 processes more rapidly will be allowed more frequent access to the bus. It is therefore possible that the same system will have a different weighting factor for each processor. The maximum number of processors that the system may support determines the number of bits used to represent N for processor arbitration calculations. Similarly, the maximum number of DSLs that a node can support determines the number of bits used to represent N for controller arbitration. The number of bits used to represent N may be made essentially arbitrarily large to meet these constraints. This number N may be determined by the wiring of a card connector so that each connector (slot) has an unique number, or alternatively may be selectable by DIP switches or code plugs or the like.

Those skilled in the art will recognize numerous advantages of the use of the above weighing factors $\alpha$ and $\beta$ in queue arbitration. For example, non-standard ISDN networks may be more readily interfaced to the present node by appropriate manipulation of these factors. In the case of a higher speed D Channel, the queue priority may be increased so that the associated DSL is given a higher rate of service. This allows faster emptying of the queue and the ability of the node to service DSLs of dissimilar speeds.

Referring now to FIG. 6 a flow chart of this process is shown. The arbitration cycle is entered at 300 and if the FIFO is not empty at 302, the priority number PN is computed at 304. Else, the control passes back to 300 until the next entry of the arbitration cycle. When the PN is computed, contention essentially occurs on a bit by bit basis. The most significant bit (MSB) is passed to step 310 where it is inverted and floated on the open collector arbitration bus at the position of the most significant bit. If the bus bit is different from the value of this bit, the failure count is incremented at 315 and control passes back to step 300. Else control passes to 320. The arbitration process proceeds from the MSB to the LSB with decisions in the arbitration process made for each individual bit. If arbitration fails at any point, the process halts as far as arbitration of the less significant bits.

The processing of each bit proceeds in a similar way. The next most significant bit is processed by similar steps 320 and 322. Finally the least significant bit is processed by 330 and 332 with the resultant output of 332 being a WIN signal if no was the answer at each of steps 312, 322 . . . 332.

Figure 7:
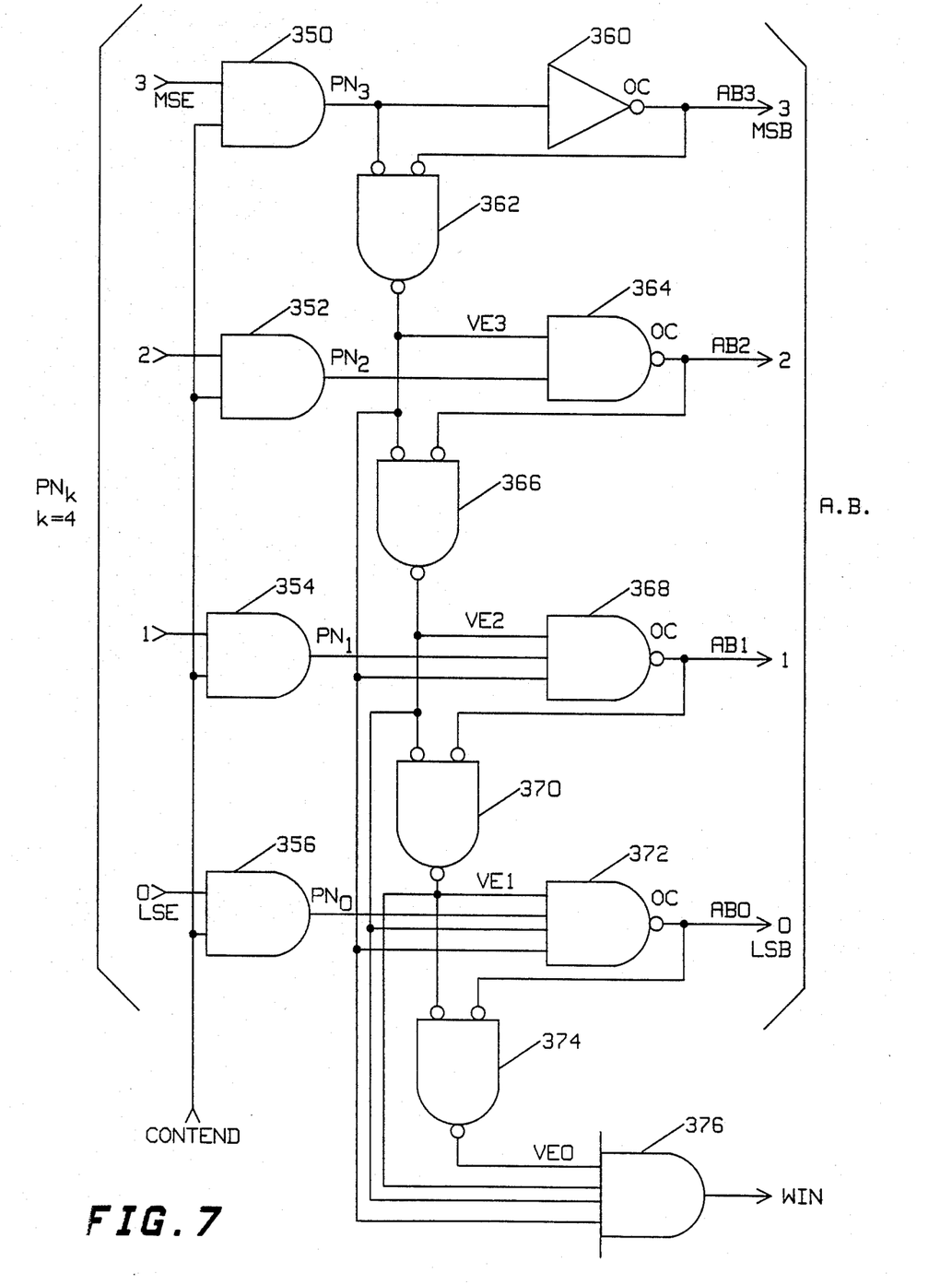
FIG. 7 shows a circuit diagram for a hardware implementation of arbitration circuitry suitable for use with the present invention.

An example of the preferred hardware implementation of an arbitration circuit is shown in FIG. 7. In this example, a four bit arbitration is used but this is not to be limiting as the circuit concepts can readily be extended by those skilled in the art to any number of bits. Each of the four bits are coupled to an AND gate input as shown with the MSB connected to 350. The LSB is connected to 356 with the intermediate bits connected to 352 and 354. The second input of each AND gate is connected together to form an enable line to enable contention. The output of the AND 350 is coupled to the input of an open collector INVERTER 360 the output of which provides the MSB for the arbitration bus labeled $AB_3$. The output of AND 350 is labeled $PN_3$. A two input NAND 362 with inverted inputs (equivalent to an OR) has one input coupled to the output of AND 350 and the second input coupled to the bus signal $AB_3$. A two input NAND with open collector output has one input connected to the output of 352 and the other input connected to the output of 362. The output of 364 provides signal $AB_2$ of the arbitration bus. Signal $AB_2$ is also coupled to one input of a two input NAND with inverted inputs 366. Its second input is coupled to the output of 362. The output of 366 also drives one input of a NAND 368 having an open collector output. A second input of 368 is coupled to the output of 362 and a third output is coupled to the output of 354.

The output of 368 forms signal $AB_1$ and is coupled to a first input of a NAND 370 having two inverted inputs. The second inverted input of 370 is coupled to the output of 366. The output of 370 is coupled to one input of a four input NAND 372 having an open collector. The other inputs of 372 are coupled to the output of 356, the output of 362 and the output of 366. The output of 372 forms signal $AB_0$ which drives one input of a two inverted input NAND 374. The second input of 374 is coupled to the output of 370. A four input AND 376 receives the outputs of 362, 366, 370 and 374 and provides an output WIN indicative of having been granted bus access. The ultimate winner of the arbitration process, thus looks at each of the bits and determines that it has the highest priority.

It should be also noted that the present arbitration process requires a finite amount of settling time for a proper determination of the winner. This finite settling time is determined by the number of bits to be arbitrated and is approximately additive for each additional bit added. Thus, the slot number length affects the total settling time. But each additional bit added to the slot number allows a doubling of the number of available procesors or controllers. The logic family selected for implementing the arbitration circuits should take this settling time into consideration so that the arbitration process does not become a 'bottle neck' in high speed processing. Similarly, the allowable values of the arbitration factors $\alpha L$ and $\beta F$ and $\alpha L + \beta F$ should be selected with these considerations in mind.

The outputs of 350, 352, 354 and 356 provides signals $PN_3$, $PN_2$, $PN_1$ and $PN_0$ respectively. The outputs of 362, 366, 370 and 374 provide signals $VE_3$, $VE_2$, $VE_1$ and $VE_0$ respectively. The open collector outputs of 360, 364, 368 and 372 provide signals $AB_3$, $AB_2$, $AB_1$ and $AB_0$ respectively. The operation of the circuit can be defined as follows:

$$VE_i = PN_i + AB_i \qquad (3)$$

$$WIN = \prod_{i=0}^{n-1} VE_i \qquad (4)$$

$$AB_i = \prod_{j=0}^{m-1} \left\{ \left[ \prod_{k=i+1}^{n-1} VE_k \right] \cdot PN_i \right\}_j \qquad (5)$$

Where:
$\pi$ means AND (product);
m = number of contenders;
j and k are counters;
n = length of priority number in bits;
PN = Priority Number;
AB = Arbitration bus; and
VE = Vector Enable.

Figure 8:
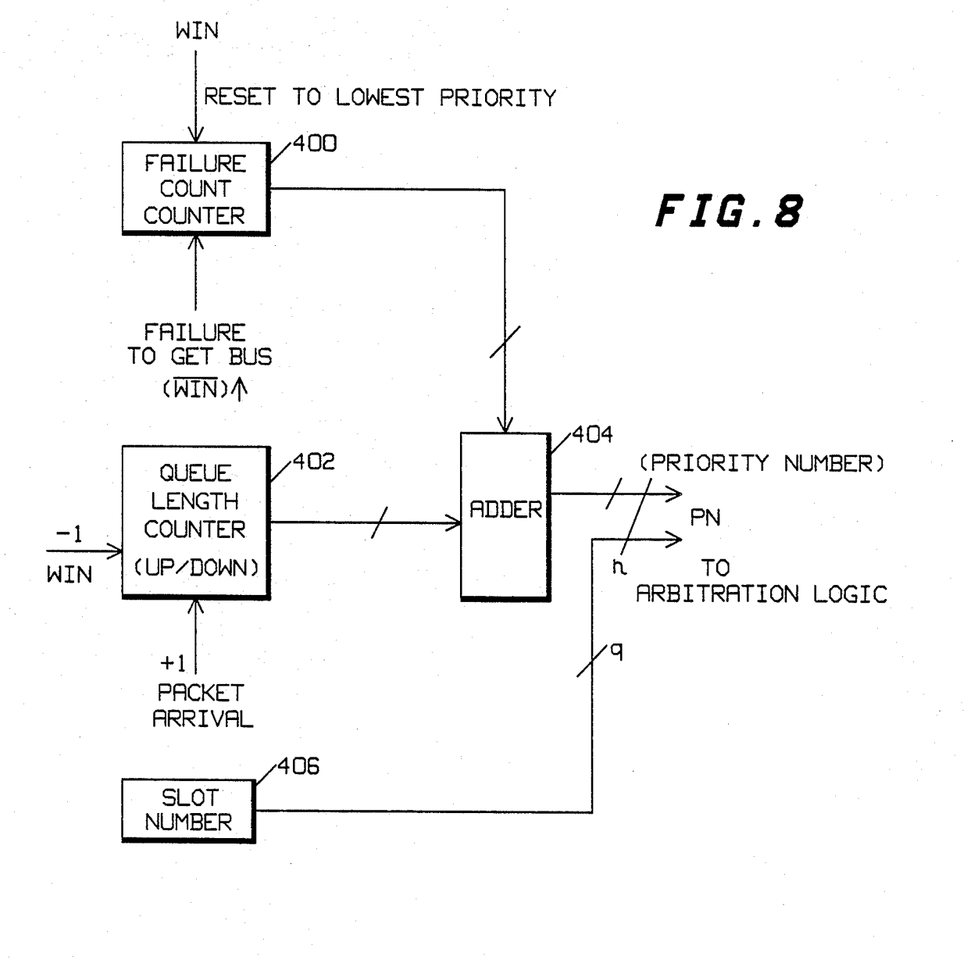
FIG. 8 shows a circuit diagram of a portion of the controllers of the present invention.

FIG. 8 shows how the WIN signal is used in priority number calculation. The WIN signal is received by a failure count counter 400 in order to reset the counter when a processor or controller wins the arbitration. The failure to get access results in incrementing the counter 400. A queue length counter 402 keeps track of the queue size and is decremented upon receipt of WIN. Similarly, it is incremented upon arrival of a packet. The output of 400 and 402 are added together at adder 404. The p bit output of the adder 404 provides the MSBs and a q bit slot number represented as 406 provides the LSBs to make up the n bit priority number PN for use by the arbitration logic. In this FIGURE, $\alpha$ and $\beta$ are shown equal to unity by absence of multipliers, but those skilled in the art will appreciate that multipliers are to be added between 400 and 404 as well as between 402 and 404, if needed, to provide appropriate weighting. The weighting factors are determined by the needs of the particular system as far as the allowable queue length and the allowable number of bus access failures. This arbitration method may be used for all bus arbitration of the present invention except as stated otherwise. In the case of processor arbitration wherein the queue length is not used, the PN is formed directly from the output of the queue length counter concatenated with the slot number.

Figure 9:
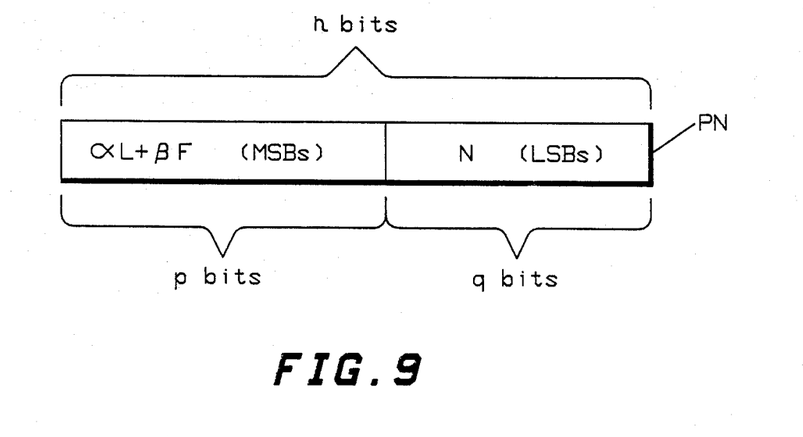
FIG. 9 shows the makeup of the Priority Number in one embodiment of the present invention.

FIG. 9 illustrates the formation of the PN with the p bit output of adder 404 forming the MSBs and the q bit slot number N forming the LSBs of the n bit PN.

It is not enough that the Layer 1 queue needs to be serviced. There has to be a processor to handle the processed frame. The processors arbitrate for the L1L2R bus among themselves as described, and the one that gains control of the bus reads the frame from the longest queue of the Layer 1 device bank. Thus the L1L2R bus has another set of arbitration lines that the processors arbitrate on. Their arbitration scheme is that of a rotating priority, as explained. The bus grant signal for the Layer 1 arbitration is an AND of the grant from the Layer 1 arbitration, and the result of the arbitration from the processor arbitration. This ensures synchronism between them. The processor that is the master of the L1L2R bus reads the frame from the appropriate Layer 1 device.

It should be noted that the term "Layer 1 device" means the combination of the Layer 1 device, LAPD frame formatter, the the FIFO and control logic for purposes of this document, i.e. Layer 1 Mux/Demux 10 and queue circuit 19. FIG. 2 shows the Layer 1 receiver block, and L1L2R bus. The L1L2% bus (for the network-user direction) has a different scenario. Here, the Layer 1 systems are the recipients, and the processors are the masters. The processors need only arbitrate among themselves for the L1L2T bus. As on th receive side, there are circular FIFOs, and a LAPD frame formatter. The L1L2T bus therefore has data, address (for the address of the DSL), clock lines and one arbitration bus for the processors.

The number of Layer 2/Layer 3 processors needed is directly related to the number of DSLs supported by the node and to the processing power of each individual processor. The processors are connected to a global memory, and to each other by means of the Processor Bus (PB), and the processors as a whole constitute the processor bank. Only a few processors are dedicated to handle special purpose processes, like the ASP, and the timer process. These special purpose processors can have direct processor-processor communication. The general purpose processors interface to the L1L2R and the L1L2% buses through bus gateways. The global memory is a shared virtual memory in the preferred embodiment. The operation of the processor bank is detailed below.

A processor, by use of the present arbitration scheme, can access one of the L1L2R, L1L2%, PB, IPB, L3NC busus at a given time. When a processor accesses a bus, any other processors can access any of the other buses at the same time.

Assume the processor has access to the L1L2R bus. It reads a Layer 2 frame in. One of the following situations could occur:
 1. It is a request for TEI assignment/removal.
 2. It is request for Layer 2 establishment.
 3. It is a request for call request/teardown.
 4. It is call processing message other than those detailed in #1, #2 and #3.

Case 1: The processor sends a processor-processor message to the ASP processor (if the ASP was not the one which accessed the L1L2R bus), which has an on board mailbox. The ASP processor services the request on a first come first served basis. For a TEI assignment, the ASP arbitrates for the PB and accesses the global memory. It creates a virtual address space which maps the DSL port number, the L3 address, TEI value. The TEI assignment message is sent back on the DSL, by the ASP processor via the L1L2T bus, after the necessary arbitration. The arbitration to gain access to the L1L2T bus is that of a rotating priority (that is, each processor gets equal priority to the L1L2T bus and the processors take turns actually accessing the bus), with the exception of the ASP, which has a fixed high priority. Arbitration for the PB is on a rotating priority scheme.

If the process to be performed is a TEI removal, the ASP removes the entries stored in memory, after accessing it through the PB.

Case 2: On a Layer 2 establish request, the processor runs the Layer 2 process, and accesses the memory allocated to this TEI, and DSL (explained in case 1). The logical variables, timers, counters are initialized, memory is allocated for receive and transmit buffer space, and the Layer 2 acknowledge is readied to be sent to the user. This is done by accessing the L1L2T bus, as explained above.

If the process is a Layer 2 termination, the processor deallocates the memory allocated. Of course, the PB is arbitrated for memory access.

Case 3: The Layer 2 process ensures that the Layer 2 protocol is adhered to, and then the processor executes the Layer 3 process for call establishment. At this stage, a mapping between the source and destination address is done. If the called user is serviced by the same node, a Layer 3 setup message is created. This is handled by the Layer 2 process, the L1L2T bus is accessed, and the message is sent. If the destination is outside the node, the processor accesses the L3NC bus and propagates the call set up message to be handled by the network controller. The switching fabric has to be addressed to set the switches.

A similar scenario exists for call disestablishment.
Case 4: Identical to case 3.

It should be noted that in all cases, timers may be maintained. A processor is dedicated to run the timer management process. This timer processor is on the PB bus only. The timer-processor is given messages by interprocess communication, similar to the ASP. Both the ASP and the timer-processor have the same interprocessor communication bus. The timer process is given all the information (DSL, TEI, timer value), and in the event of a time out, the timer process, accesses the global memory using the PB, and store the timeout information on a stack.

So now, the processors have to perform the following functions, in the assigned priorities.
 1. Check which processes have timed out (by checking the timeout stack in the global memory), and take appropriate action.
 2. Access the PB to do Layer 2 and Layer 3 functions.
 3. Access L1L2T bus.
 4. Access L1L2R, L3NC bus.

The processors may have variable priorities for each bus. The processor attempts to access one bus, but, if it is unable to do so, it increments its priority by incrementing F for that bus, and attempts to access one of the other buses. Once the bus is obtained, F is set to the lowest value for that bus. In case there are more than one processors with the highest priority arbitrating for the bus at the same time, the bus is granted to that processor which has the highest address, based on the slot position on the backplane as previously described.

FIG. 3, as described previously, shows the processor bank and the bus interfaces for one processor. It is emphasized that the type of particular processor used is not important, freeing the implementer from being tied to one processor from a given manufacturer. Any processor can be used, as long as the interface to the standard gateways to the various buses is maintained.

The number of processors used is dependent upon the signaling load on the system, and processors can be added/removed, based on this load, providing a modular building architecture. Due to the number of processors used, the delay in processing the messages is minimized.

Many variations as previously described will be evident to those skilled in the art in view of the description provided above. The various configurations using parallel and serial communications, the use of dedicated processors in place of and in conjunction with the general purpose processors, the use of custom and emicustom integration for portions of the present invention as well as many other variations are contemplated by the present invention.

Thus it is apparent that in accordance with the present invention, a method that fully satisfies the aims, advantages and objectives is set forth above. While the invention has been described in conjunction with with specific embodiments, it is evident that many alternatives, modifications and variations will become apparent to those skilled in the art upon consideration of the foregoing description. Accordingly, it is intended that the present invention embrace all such alternatives, modifications and variations as fall within the spirit and broad scope of the appended claims.

What is claimed is:

1. A node for a communication system for processing a D-Channel ISDN message, comprising in combination:
  interface means for receiving an ISDN signal from a transmission line;
  demultiplexing means for demultiplexing said ISDN signal into a D-Channel message and for performing Physical Layer processes on said D-Channel message;
  a processor bank including a plurality of processors which are interconnected by a bus for receiving said D-Channel message after said D-Channel message is processed by said demultiplexing means and for performing a Data Link Layer process on said D-Channel message; and arbitration means for determining which of said plurality of processors is to perform said Data Link Layer process on said D-Channel message.

2. The apparatus of claim 1, wherein said arbitration means further comprises means for establishing a priority number for each of said processors in said processor bank, and wherein a processor having highest priority number is selected to perform said Data Link Layer process.

3. The apparatus of claim 2, further comprising computing means for computing said priority based upon a number of previously unsuccessful attempts by the processor to access said bus.

4. The apparatus of claim 3, wherein said computing means further comprises means for computing a priority number PN representing said priority as follows:

$$PN = CON\{\beta F, N\}$$

$\beta$ is a constant;
F is a number of bus access failures; and
N is a processor number.

5. The apparatus of claim 2, further comprising an arbitration bus and wherein each of said processors applies its priority number to said arbitration bus so that the processor with the highest priority is selected.

6. The apparatus of claim 1, wherein said processor bank includes a plurality of processors which are capable of performing either Data Link Layer or Network Layer processes and wherein said arbitration means further comprises means for determining which of said plurality of processors is to perform said Network Layer process.

7. The apparatus of claim 1, wherein each of said processors further comprises a computer and gateway means for interfacing said computer to a common set of communication buses so that communication on said buses is essentially independent of characteristics of said computer.

8. The apparatus of claim 1, wherein said processor bank further comprises a plurality of processors for computing a Network Layer process and wherein said arbitration means determines which of said processors performs said Network Layer process.

9. The apparatus of claim 4, wherein $\beta$ is a different value for two of said processors.

10. The apparatus of claim 1, further comprising a plurality of queues for containing a plurality of segments of D-channel information to be processed by said processor bank.

11. The apparatus of claim 10, further comprising queue arbitration means for determining which of said plurality of queues is to be serviced by said processor bank.

12. The apparatus of claim 11, wherein said queue arbitration means include means for computing a priority number for each of said queues and wherein said processor bank processes the information from the queue with the highest of said priority numbers.

13. The apparatus of claim 12, wherein each of said queues attempts to access said bus and wherein said computing means computes the priority number PN for each queue as follows:

$$PN = CON\{(\alpha L + \beta F), (N)\}$$

Where:
$\alpha$ and $\beta$ are constants,
L = a queue length,
F = the number of unsuccessful attempts to access said bus, and
N = a processor number associated with each of said processors.

14. The apparatus of claim 13, wherein said arbitration means performs a bit by bit arbitration on the priority numbers starting with the most significant bit and proceeding through the least significant bit.

15. The apparatus of claim 1, wherein each of said plurality of processors include a microprocessor.

16. The apparatus of claim 15, wherein each of said processors includes a gateway means for providing a common communication format with said demultiplexing means.

17. The apparatus of claim 4, wherein said microcomputer includes a nonvolatile memory, and wherein $\beta$ is stored in said nonvolatile memory.

18. The apparatus of claim 17, wherein said nonvolatile memory includes a read only memory.

19. The apparatus of claim 18, further including a plurality of circuit slots each associated with one of said plurality of processors as an indication of the physical location of installation of each of said processors and wherein N is unique for each of said slots.

20. A method for processing a D Channel ISDN message, comprising the steps of:
receiving an ISDN signal from a transmission line;
demultiplexing said ISDN signal to produce a D Channel message;
performing a Physical Layer process on said D Channel message;
selecting one of a plurality of available processors interconnected by a bus to perform a Data Link Layer process on said D Channel message.

21. The method of claim 20, further comprising the step of performing said Data Link Layer process after said Physical Layer process has been completed.

22. The method of claim 21, further comprising the step of selecting one of said plurality of available processors to perform a Network Layer process on said D Channel message after said Data Link Layer process has been completed.

23. The method of claim 22, further comprising the step of performing said Network Layer process after said Data Link process.

24. The method of claim 20, wherein said selecting step includes the step of arbitrating among said plurality of processors, of which at least two are attempting to access said bus.

25. The method of claim 24, wherein said arbitration step includes computing a priority number designated PN for each of said plurality of processors.

26. The method of claim 25, wherein said priority number PN is:

$$PN = CON\{\beta F, N\}$$

where:
$\beta$ is a constant;
F is a number of bus access failures; and
N is a processor number associated with each one of said plurality of processors.

27. The method of claim 26, wherein said plurality of processors include at least a first processor having computing power greater than that of a second processor and wherein $\beta$ is greater for said first processor than said second processor.

28. The method of claim 26, wherein $\beta$ is not equal to 1.

* * * * *